(12) United States Patent
Huiberts

(10) Patent No.: US 6,272,919 B1
(45) Date of Patent: Aug. 14, 2001

(54) METHOD FOR MEASURING A GAS FLOW RATE AND A GASMETER THEREFORE

(75) Inventor: Albertus Theodorus Huiberts, Amsterdam (NL)

(73) Assignee: Gascontrol B.V., Amsterdam (NL)

(*) Notice: Subject to any disclaimer, the term of this patent is extended or adjusted under 35 U.S.C. 154(b) by 0 days.

(21) Appl. No.: 09/491,147

(22) Filed: Jan. 26, 2000

Related U.S. Application Data

(63) Continuation of application No. PCT/NL97/00445, filed on Jul. 29, 1997.

(51) Int. Cl.[7] .................................................. G01F 1/68
(52) U.S. Cl. ................................. 73/204.18; 73/861.95
(58) Field of Search .......................... 73/861.95, 202.5, 73/204.14, 204.18, 1.29, 1.34

(56) References Cited

U.S. PATENT DOCUMENTS 3,425,277 * 2/1969 Adams ................................ 73/202.5

4,885,938   12/1989   Higashi ............................. 73/204.18

FOREIGN PATENT DOCUMENTS

| 1463507 | 2/1977 | (GB) . |
| GB 2 003 659A | 3/1979 | (GB) . |
| WO 94/10540 | 5/1994 | (WO) . |

* cited by examiner

Primary Examiner—Harshad Patel
(74) Attorney, Agent, or Firm—Hoffmann &Baron, LLP

(57) ABSTRACT

Gasmeter for determining a flow rate of gas within a channel is provided. The gasmeter includes a channel for passing through it a flow of gas along a first sensor and a chamber which is arranged for receiving and containing at substantially stand still gas from the channel and in which a second sensor is arranged. The sensors are heated during heating periods and subsequently let cooled down in cooling periods. The cooling rate of the sensors is determined and are used to calculate a value of the flow rate through the channel which is compensated for change of density of the gas.

12 Claims, 2 Drawing Sheets

METHOD FOR MEASURING A GAS FLOW RATE AND A GASMETER THEREFORE

CROSS-REFERENCE TO RELATED APPLICATIONS

This is a continuation application of PCT/NL9700445 filed Jul. 29, 1997.

FIELD OF THE INVENTION

The invention relates to a method and a gasmeter according to a method for determining a flow rate value of gas inside a channel in which there is arranged a first sensor which is connected to processing means for driving the first sensor, comprising:
alternately driving the first sensor to heat it and to let it cool down;
measuring a cooling rate value (Mx) of the first sensor during its cooling down;
during a calibration stage, supplying a calibration gas at different flow rates to the channel, measuring for each of said flow rates of the calibration gas a pair of flow rate value ($\phi$j) and a cooling rate value (Mj) of the first sensor and preparing a calibration table containing such pairs of values ($\phi$j, Mj);
after calibration and for a current gas applying the calibration table to determine a current flow rate value ($\phi$) for a current cooling rate value (Mx) of the first sensor.

The invention also relates to a gasmeter comprising a channel for passing through it a flow of gas, a first sensor, which is arranged inside said channel, and processing means, which are connected to said first sensor for driving the first sensor alternately to heat it and to let it cool down, measuring a cooling rate value (Mx) of the first sensor during its cooling down, and determining a current value of a flow rate of a current gas inside the channel corresponding to said measured cooling rate value (Mx) of the first sensor by using a calibration table containing pairs of different flow rate values ($\phi$j) and associated cooling rate values (Mj) of the first sensor determined in advance for a calibration gas.

BACKGROUND OF THE INVENTION

A method and gasmeter of the above identified type are disclosed by WO 9410540. When the flow rate of gas passing along the first sensor decreases or increases the first sensor will cool down slower, faster respectively after being heated up. Therefore, since a current cooling rate value can be measured, a corresponding value of the current flow rate can be derived from the current cooling rate value by using said calibration table.

The density of the gas may change by changes of temperature and/or pressure of the gas. When the density increases or decreases a larger, smaller amount of gas molecules will strike the sensor per unit of time and therefore the sensor will cool down faster, slower respectively. Accordingly, this will be reflected to the current flow rate value too derived from the measured current cooling rate value. In other words, when referring to a situation with a reference temperature and reference pressure, the gasmeter will determine the gas flow rate in terms of a quantity of gas molecules per unit of time, rather than a volume per unit of time (as with commonly used bellow meters).

When the gasmeter has been calibrated with said reference temperature and said reference pressure (or different references derived therefrom by using the law of Boyle-Gay-Lussac), a quantity of gas molecules passed per unit of time, represented by a measured flow rate value, is associated with a current cooling rate value as calibration value. When measuring an identical cooling rate value afterwards, the current flow rate value will be identical to the corresponding calibration flow rate value also, no matter the values of the temperature and pressure at that later time. Also, when the same quantity of gas molecules as during calibration passes during identical periods of time during calibration and thereafter, the gasmeter will provide identical flow rate values, no matter the values of the temperature and pressure at the later time. Therefore the gasmeter can be calibrated to provide a current flow rate value as volume of time still.

A drawback of the prior art gasmeter is that, when in actual use, the provided flow rate values will differ when a current gas is different from a gas used during calibration. Therefore it will be necessary to calibrate the gasmeter by using a gas which is identical to a gas for which the gasmeter is destined to be used with. In many situations, such as in case of using natural gas, this may be a problem in view of safety, waste gas handling and costs. To provide a gasmeter of this type with a certain measurement accuracy range, this requires the manufacturing, calibration and keeping in stock of as many types of gasmeters, resulting in a further increase of costs.

In addition, after installation, the density of the gas to be measured may differ for other reasons. For example, in case of natural gas, the gas suppliers receive gas of several compositions and they will try to provide a mixture thereof to consumers having a heating power per unit of volume which is as constant as possible. To do so any suitable auxiliary gas, such as nitrogen, may be added. However, the result of this will be that the density of the resulting gas (or gas composition) supplied to the consumers may differ from time to time for identical temperatures and pressures resulting in different cooling rate values and therefore different associated flow rate values in spite of identical of such volumes per unit of time and therefore leading to incorrect measurement values.

U.S. Pat. No. 4,885,938 discloses a method for compensating the mass flow measurement of a fluid flowmeter of the thermal microananometer class for changes in the composition of the fluid of interest the flow of which is thought to be determined or monitored. The method comprises the steps of: obtaining an on-going uncorrected nulled mass flow value for the fluid of interest in relation to the microananometer sensor output; obtaining the specific heat thermal conductivity and density of the fluid; and obtaining the corrected mass flow from the nulled mass flow according to a specific formula containing said four independent variables. To that end values of the specific heat, thermal conductivity and density of the gas are derived from a static ananometer measurement of the fluid of interest by using a chamber which communicates with the proper or main fluid channel, in which the chamber provides basically a static environment with respect to flow. The channel contains a first microbridge or microananometer sensor and the chamber contains a second sensor of the same type as of the first sensor. Such type of microbridge sensors must be mounted with a specific orientation with respect to a flow of fluid passing along it, one branch of the bridge being heated above ambient temperature and an unbalance of the bridge being measured to determine the flow rate of the passing fluid. The flow rate determined by the first sensor is nulled, i.e. it is corrected by subtracting its value obtained at zero flow. The second sensor is used to determine values for the specific heat, thermal conductivity and density of the fluid contained basically static in the chamber. The document does not disclose how this is carried out but refers to a system described in co-pending applications thereof.

Though the formula disclosed by U.S. Pat. No. 4,885,938 is simple, its application requires an additional system for deriving values of three independent variables, which makes this prior art method and flow meter too complex, bulky and expensive for use in a domestic gasmeter.

While the method disclosed by U.S. Pat. No. 4,885,938 measures and compensates a flow rate value directly, with the method disclosed by WO9410540 a cooling rate of a preheated sensor is measured without measuring or determining other properties of the current fluid after installation of the meter.

SUMMARY OF THE INVENTION

It is an object of the invention to solve the disadvantages of the prior art mentioned hereinbefore.

Therefore the invention provides a method for determining a flow rate value of gas inside a channel in which there is arranged a first sensor which is connected to processing means for driving the first sensor, comprising:
alternately driving the first sensor to heat it and to let it cool down;
measuring a cooling rate value (Mx) of the first sensor during its cooling down;
during a calibration stage, supplying a calibration gas at different flow rates to the channel, measuring for each of said flow rates of the calibration gas a pair of flow rate value ($\phi$j) and a cooling rate value (Mj) of the first sensor and preparing a calibration table containing such pairs of values ($\phi$j, Mj);
after calibration and for a current gas applying the calibration table to determine a current flow rate value ($\phi$) for a current cooling rate value (Mx) of the first sensor; further comprising
deriving an auxiliary flow of the current gas from the channel towards a chamber, the auxiliary flow being of a magnitude of basically zero with respect to a main flow inside the channel to keep the gas inside the chamber (16) basically at stand still, while a second sensor of the same type as the first sensor being arranged inside the chamber and connected to and to be driven by the processing means;
alternately driving the second sensor to heat it and to let it cool down;
measuring a cooling rate value (Zx) of the second sensor during its cooling down;
compensating the current cooling rate value (Mx) of the first sensor to provide a compensated cooling rate value (My) on the basis of cooling rate values (Ma, Za) of both sensors obtained recently for the current gas and cooling rate values (Mg, Zg) of both sensors obtained before at stand still of gas inside the channel and the chamber, and in which the compensated cooling rate value (My) is used for determining the corresponding current flow rate value ($\phi$y) of the gas inside the channel.

The invention also provides a gasmeter comprising a channel for passing through it a flow of gas, a first sensor, which is arranged inside said channel, and processing means, which are connected to said first sensor for driving the first sensor alternately to heat it and to let it cool down, measuring a cooling rate value (Mx) of the first sensor during its cooling down, and determining a current value of a flow rate of a current gas inside the channel corresponding to said measured cooling rate value (Mx) of the first sensor by using a calibration table containing pairs of different flow rate values ($\phi$j) and associated cooling rate values (Mj) of the first sensor determined in advance for a calibration gas, further comprising a chamber which communicates with said channel for receiving gas therefrom and for containing basically at stand still with respect to flow of the received gas, a second sensor, which is of the same type as that of the first sensor and which is arranged inside said chamber and which is connected to the processing means, which alternately drive the second sensor to heat it and to let it cool down and to determine a cooling rate value (Zx) during cooling down of the second sensor, the processing means compensate a currently measured cooling rate value (Mx) of the first sensor to provide a compensated cooling rate value (My), on the basis of cooling rate values (Ma, Za) of both sensors obtained recently for the current gas and cooling rate values (Mg, Zg) of both sensors obtained before at stand still of gas inside the channel and the chamber, and in which the compensated cooling rate value (My) is used for determining the corresponding current flow rate value ($\phi$y) of the gas inside the channel.

With such a method and gasmeter calibration may take place with any suitable gas, even air. A sensitivity for a change in density due to change of composition of the gas (or gas composition) is remarkably reduced. After calibration the cooling rates of both sensors are measured only and used in computations for compensating the cooling rate of the first sensor to therewith determine the flow rate of the gas inside the channel. This makes the method and gasmeter easy to implement, basically using a processor only, without the need for additional equipment.

BRIEF DESCRIPTION OF THE DRAWINGS

Additional characteristics and advantages will be apparent from the following description of a preferred embodiment of a gasmeter according to the invention in combination with the drawings, in which.

DESCRIPTION OF THE PREFERRED EMBODIMENT

Figure 1:
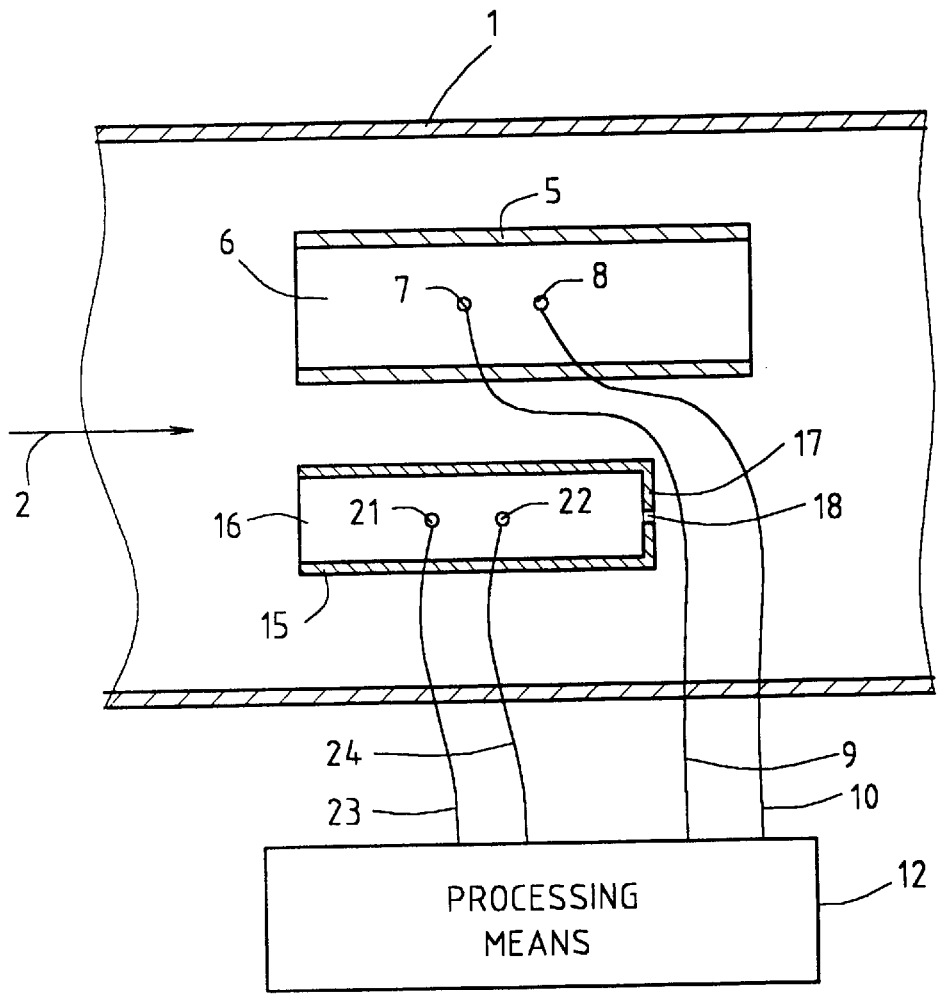
FIG. 1 shows schematically said embodiment of a gasmeter.

The embodiment of the gasmeter which is schematically shown in FIG. 1 comprises a housing 1, which may have any suitable form, such as a tube. In use, the gasmeter allows gas (or gas composition) to flow through the housing 1 in the direction indicated by arrow 2.

Inside the housing 1 there is arranged a tube part 5, which provides a channel 6 of which a centre line is preferably parallel to said direction 2. Inside the channel 6 there is arranged an ambient temperature sensing sensor 7. Downstream from sensor 7 there is arranged a flow rate measuring sensor 8 inside the channel 6. Sensors 7, 8 are connected by suitable wiring 9, 10 respectively to processing means 12.

Sensors 7, 8 may be any type of sensor which can be heated up during a heating period and its cooling down be monitored and measured by the processing means 12 during a subsequent cooling period. In the following it is assumed sensors 7, 8 are thermistors having a negative temperature coefficient.

A gasmeter of the type as described this far with reference to FIG. 1 is disclosed by WO 9410540. Operation thereof will be described hereinafter to the extent which is relevant to the present invention.

In addition, according to the invention, there is arranged an auxiliary member 15 having a chamber 16, which is open at an upstream end thereof and which has a closure member 17 at an downstream end thereof. Preferably the auxiliary member 15 is a tube part of which a center line is parallel to the direction 2 of the flow of gas. Still preferably, the closure member 17 has a small, central opening 18 to enable a small flow of gas through said chamber 16, so its contents will be refreshened by a current gas (composition).

As with channel 6, inside the chamber 16 there are arranged an ambient temperature sensing sensor 21 and, downstream thereof, a flow rate measuring sensor 22. Sensors 21, 22 are connected to the processing means 12 by appropriate wiring 23, 24 respectively.

Preferably, the type of sensors 21, 22 is identical to the type of sensors 7, 8. This will ease preparing formulaes for processing measurement signals from the sensors 7, 8, 21, 22 and calibration.

Figure 2:
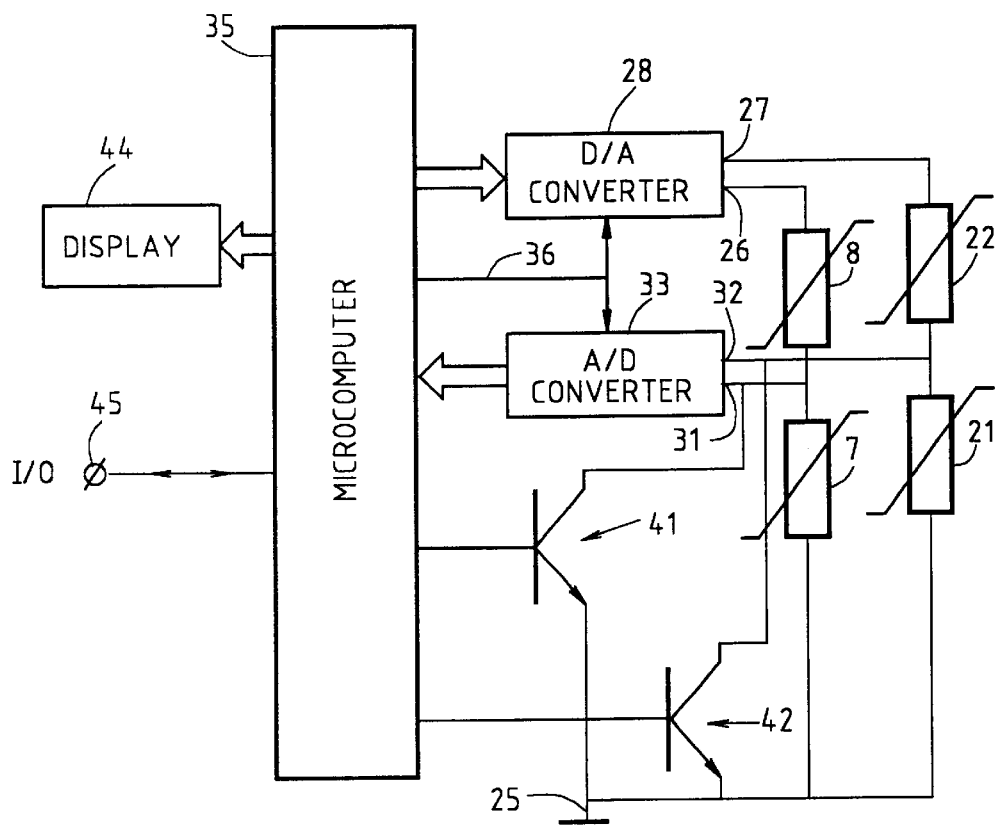
FIG. 2 shows a diagram of electronic circuitry used with said gasmeter.

FIG. 2 shows said sensors 7, 8, 21, 22 and the processing means 12 in more detail.

As shown each pair of sensors 7, 8 and 21, 22 respectively are connected as voltage divider, of which one end is connected to ground or mass 25, and of which an other end is connected to an output 26, 27 respectively of a digital/analog-converter 28. An intermediate node of said voltage dividers is connected to an input 31, 32 respectively of analog/digital-converter 33. The D/A-converter 28 is connected to a microcomputer 35 to receive in parallel data from the microcomputer 35 to supply an output voltage at output 26 or output 27 of which the magnitude corresponds to a value of said data.

The A/D-converter 33 is connected to microcomputer 35 to provide data of which a value corresponds to a magnitude of an input signal at input 31 or 32.

Converters 28 and 33 are time shared by said voltage dividers and are controlled by microcomputer 35 through a connection 36 to have D/A-converter 28 output to output 26 or 27 and, at the same time, to have A/D-converter 33 input from input 31 or 32 respectively.

Two NPN transistors 41, 42 have their collectors connected to inputs 31, 32 respectively of A/D-converter 33, their emitters to ground 25 and their bases individually to microcomputer 35.

Microcomputer 35 is connected to a display device 44, which is suitable for displaying a measured flow rate and/or an accumulated volume passed through the gasmeter.

In addition the microcomputer 35 can be connected to an input/output terminal (I/O) 45, which can be used for telemetry purposes.

Figure 3:
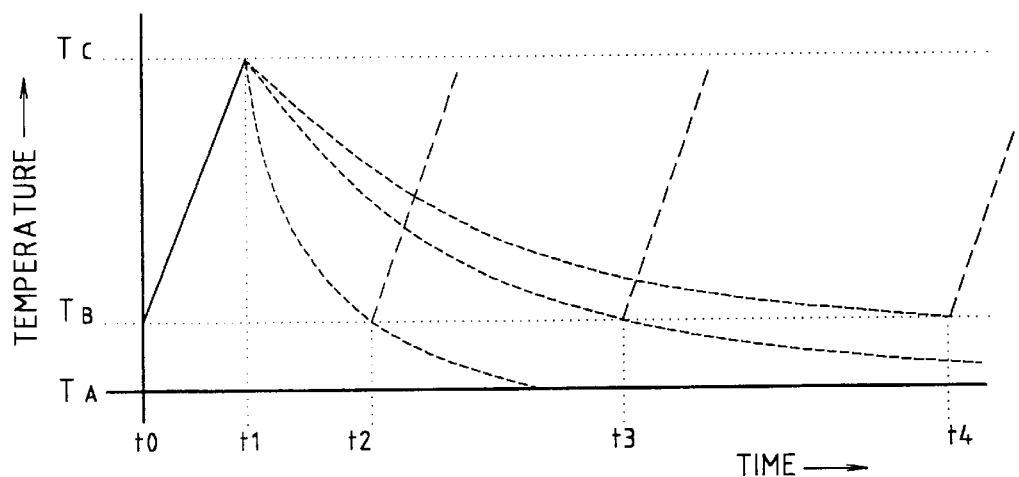
FIG. 3 shows a diagram of the temperature of a sensor used with the gasmeter as function of time for different gas flow rates.

The operation of the circuit shown in FIG. 2 for the voltage divider with sensors 7, 8 is as follows:

During a heating period the microcomputer 35 controls the D/A-converter 28 to provide a specific voltage to output 26, controls transistor 41 to not conduct and controls A/D-converter 33 to convert a voltage at input 31 to a digital value and to provide same to the microcomputer 35. This digital value represents a temperature difference between sensors 7, 8. When the temperature of both sensors 7, 8 is identical and sensors 7, 8 are identical, said input voltage is half the voltage at output 26 of D/A-converter 28. This temperature is the ambient temperature TA of the gas entering the gasmeter. Assuming the gasmeter is operating already for a while, at some instant the temperature of downstream sensor 8 is a predetermined amount, TB-TA, above said ambient temperature TA. From that moment of time microcomputer 35 increases the voltage at the output 26 of D/A-converter 28 and controls transistor 41 to conduct, thus bypassing sensor 7. As a consequence sensor 8 is heated up and sensor 7 is (substantially) not heated up. This process of said measuring and heating up as described is repeated intermittently and the voltage at output 26 is adjusted during this process time in order to have the temperature of sensor 8 follow a predetermined, reference curve, such as a straight line shown in FIG. 3 between temperatures TB and TC for each such heating period t0–t1.

When reaching a specific temperature TC above TB the voltage for heating sensor 8 is replaced by the voltage for measuring the temperature of sensor 8. During a cooling period to follow, sensor 8 tends to cool down from temperature TC to ambient temperature TA. However, when cooled down to temperature TB said heating process is started again, and so on.

The time of cooling period t1–t2 during which the temperature of sensor 8 decreases from TC to TB is a measure for the gas flow rate. As the flow rate decreases, sensor 8 will be cooled slower and said cooling period lasts longer, for example t1–t3 or t1–t4. The same applies when the density of the gas (composition) decreases.

Temperature TB can be any temperature which allows sufficient accurate measurements. For example, TC−TB=15° and TB−TA=1,6*(time constant of cooling curve).

The operation of the voltage divider with sensors 21, 22 is identical to that of the voltage divider with sensors 7, 8. However, a heating-cooling cycle for voltage divider with sensors 21, 22 need not be as frequent as with the voltage divider with sensors 7, 8. As a result sensor 22 will age must less than sensor 8 and may therefore be used for compensating aging of sensor 8, as will be apparent hereinafter.

Since a flow rate inside chamber 16 is substantially zero, which situation is created also during calibration time and after installation of the gasmeter in situ, an origin at zero flow of a gas flow rate as function of the time constant of a cooling rate of sensor 8 can be compensated for different gas compositions by using a current "zero"-flow cooling rate value of sensor 22 for a current gas, while relating it to such value obtained during calibration for a calibration gas, which may have been air.

Formulaes to be used for such compensation will differ from the type of sensors used. Yet, as for an example an approach will be described in case said sensors are thermistors.

In the formulaes to follow the following declarations are valid:

| | |
|---|---|
| φ | flow rate (volume per unit of time); |
| M | cooling time constant of sensor 8; |
| Z | cooling time constant of sensor 22; |
| Mc, Zc | measured values of M, Z for a calibration gas at stand still (that is, both in channel 6 and chamber 16); |
| Mi, Zi | initialisation values of M, Z for a specific gas of use at stand still; |
| Mg, Zg | M, Z for use in forrnula providing MO: during calibration: Mc, Zc when installing gasmeter: Mi, Zi after installation: measured at φ = 0; |

-continued

| | |
|---|---|
| Mx, Zx | M, Z during measuring for current gas, in particular at $\phi \neq 0$; |
| Ma, Za | Mx, Zx averaged over a specific number (for example 32) measurement values; |
| M0 | calculated M (fictitious origin) for current gas, assumed at stand still; |
| My | Mx compensated by M0; |
| $\phi y$ | $\phi$ associated with My |
| $\phi j$ (Mj) | calibration table for a number of pairs ($\phi$, M) for calibration gas; |
| M1, M2 | example of two successive values of Mj with M1 ≧ My ≧ M2; |
| F0 | origin correction factor for M0 ≠ Mc; |
| Fc($\phi$) | table with calibration correction factors Fc for several $\phi$ of said calibration gas; |
| Ft | aging correction factor for M0. |

Gas flow rate value to be calculated for measured Mx:

$$\phi y = \phi 1 * \mathrm{Exp}\left[\left(\frac{M1 - My}{M1 - M2}\right) * \mathrm{Ln}\left(\frac{\phi 2}{\phi 1}\right)\right] \quad (1)$$

with:

$$My = Mx * \left(\frac{Mc}{M0} + F0\right) \quad (2)$$

$$F0 = \frac{Mc - M0}{Mc} * \frac{Fc}{358.4} \quad (3)$$

$$M0 = Za * \frac{Mg}{Zg} * Ft \quad (4)$$

$$Ft = \frac{Ma}{M0} \text{ (if } Ma \leq M0 \leq 0 \text{ then } Ft = 1) \quad (5)$$

Calibration:

The gasmeter according to the invention can be calibrated by using a calibration gas which is different from a gas for which the gasmeter is destined. In particular the calibration gas is air, which is used in the examples hereafter (time constants in milli-second and flow rate values in liter/hour).

It is assumed that during calibration it is measured that:
Mc=12319 and Zc=12851.

With no aging having occurred at calibration time it follows that Ma=M0, so that Ft=1. Then:

$M0$=12851*12319/12851*1=12319; and $F0$=(12319−12319)/12319*358,4=0;

For an illustrative current flow rate value of the calibration gas of Mx=3410 ms:

$My$=3410*(12319/12319+0)=3410.

Further assuming calibration pairs ($\phi$, M) of (900, 3581) and (1200, 3303) are closest both sides to a pair to be calculated for My=3410. Then:

$\phi y$=900*Exp[(3581−3410)/(3581−3303)*Ln(1200/900)]=1074.

Operation with Intended Use Gas:

Assume that for a gas for which the gasmeter is intended to be used initial values for starting the calculation process are:

Mi=10907 and Zi=11459.

After installing of the gasmeter and when chamber 16 contains said destined gas, the gasmeter will notice that current Z Zc and will therefore make the following initial assignments:

Zc=Zi, Zg=Zi, Za=Zi, Mg=Mi and Ma=Mi, so that:

Zc=11459, Zg=11459, Za=11459, Mg=10907 and Ma=10907.

At installation time no significant aging has occurred yet and Ma=M0 so that Ft=1. Then:

$M0$=11459*10907/11459*1=10907.

Further assume that said illustrative current flow rate value Mx=3410 ms, and according to a calibration table a corresponding value for Fc=145 then, so that:

$F0$=(12319−10907)/12319*145/358,4=0,04637;

$My$=3410*(12319/10907+0,04637)=4010; and $\phi y$=600*Exp[(4042−4010)/(4042−3581)*Ln(900/600)]=617.

Operation with Different Use Gas:

Assume that the average cooling rate of sensor 22 at "zero"-flow rate in chamber 16 changes to Za=11246. Since such change cannot be caused by change in temperature or pressure, as described before, it must be caused by a change of density of gas or gas composition. Then, with:

Zc=11459, Zg=11459, Za=11246, Mg=10907 and Ma=10907, so that:

$M0$=11246*10907/11459*1=10704

(it appears that Ma<M0, so that Ft=1);

$F0$=(12319−10704)/12319*145/358,4=0,05304;

$My$=3410*(12319/10704+0,05304)=4105; and $\phi y$=300*Exp[(4885−4105)/(4885−4042)*Ln(600/300)]=570

(notice change of pairs of ($\phi j$, Mj) for changed My).

From the above it will be clear that a measured time constant of the illustrative Mx=3410 ms in both second and third calculation examples is caused by a smaller flow rate with the third example than with the second example, which means that with the third example the gas density is greater than with the second example. Yet, in reality, assuming that the consumer takes identical volumes per unit of time, possibly because the heating power per volume of time is controlled to be constant by the provider, in case of said different gas it will take a larger flow rate, resulting in a smaller time constant than Mx=3410 ms, which in turn results in a larger calculated flow rate value than $\phi y$=570 l/h to obtain the same amount of heating power per unit of time by the consumer.

From the above it will be clear that the gasmeter according to the invention provides correct measurement values of a gas flow rate, irrespective its temperature, pressure and composition with respect to a calibration gas.

It is observed that the gasmeter according to the invention may be arranged physically in several different ways. For example, the tube part 5 of FIG. 1 may be omitted with the sensors 7, 8 arranged inside the housing 1 which then acts like channel 6. Further, the processing means 12 may comprise an ASIC with dual integrated D/A and A/D converters.

What is claimed is:

1. Method for determining a flow rate value of gas inside a channel in which there is arranged a first sensor which is connected to processing means for driving the first sensor, comprising:

alternately driving the first sensor to heat it and to let it cool down;

measuring a current cooling rate value (Mx) of the first sensor during its cooling down;

during a calibration stage, supplying the gas or a different gas at different flow rates to the channel, measuring for each of said flow rates of the gas or the different gas a pair of flow rate value ($\phi$j) and a cooling rate value (Mj) of the first sensor and preparing a calibration table containing such pairs of values ($\phi$j, Mj);

after calibration applying the calibration table in determining a current flow rate value ($\phi$y) dependent on the current cooling rate value (Mx) of the first sensor and on the calibration table;

deriving an auxiliary flow of the gas from the channel towards a chamber, the auxiliary flow being a magnitude of basically zero with respect to a main flow inside the channel to keep the gas inside the chamber basically at stand still, while a second sensor of the same type as the first sensor being arranged inside the chamber and connected to and to be driven by the processing means;

alternatively driven the second sensor to heat it and to let it cool down;

measuring a cooling rate value (Zx) of the second sensor during its cooling down;

compensating the current cooling rate value (Mx) of the first sensor to provide a compensated cooling rate value (My) on the basis of cooling rate values (Ma, Za) of both sensors obtained recently for the gas prior to the measuring of the current cooling rate value (Mx) and cooling rate values (Mg, Zg) of both sensors obtained previously at stand still of the gas inside the channel and the chamber, and in which the flow rate value ($\phi$y) of the gas inside the channel is determined from the compensated cooling rate value (My) by means of the calibration table.

2. Method according to claim 1, wherein when determining the current flow rate value ($\phi$y) of the gas inside the channel, the processing means calculate and use an average value (Za) of a series of recently measured cooling rate values (Zx) of the second sensor.

3. Method according to claim 1, wherein, when determining the current flow rate value ($\phi$y) of the gas inside the channel, the processing means calculate and use a cooling rate factor (M0) of the first sensor corresponding to stand still of the current gas in the channel based on one or more recent cooling rate values (Za) of the second sensor and cooling rate values (Mg, Zg) of both sensors obtained in advance for no flow of gas inside the channel.

4. Method according to claim 1, wherein, when determining the current flow rate value ($\phi$y) of the gas inside the channel, the processing means calculate and use a cooling rate factor (M0) of the first sensor corresponding to stand still of the current gas in the channel based on one or more recent cooling rate values (Za) of the second sensor obtained in advance for no flow of gas inside the channel, and when determining the current flow rate value ($\phi$y) of the gas inside the channel, the process means calculate and use a correction factor (F0) for the current cooling rate value of the first sensor, based on a calibration cooling rate value (Mc) of the first sensor for said calibration gas at basically stand still and on said cooling rate factor (M0) of the first sensor.

5. Method according to claim 1, wherein, when determining the current flow rate value ($\phi$y) of the gas inside the channel, the processing means calculate and use a cooling rate factor (M0) of the first sensor corresponding to stand still of the current gas in the channel based on one or more recent cooling rate values (Za) of the second sensor and cooling rate values (Mg, Zg) of both sensors obtained in advance for no flow of gas inside the channel, and when determining the current flow rate value ($\phi$y) of the gas inside the channel, the processing means calculate an aging correction factor (Ft) comprised of an average value (Ma) of a series of current cooling rate values (Mx) of the first sensor divided by said cooling rate factor (M0) of the first sensor.

6. Method according to claim 1, wherein an interval between succeeding periods for heating the second sensor is longer than an interval between succeeding periods for heating the first sensor.

7. Gasmeter, comprising a channel for passing through it a flow of gas, a first sensor, which is arranged inside said channel, and processing means, which are connected to said first sensor for driving the first sensor alternately to heat it and to let it cool down, measuring a cooling rate value (Mx) of the first sensor during its cooling down, and determining a current value ($\phi$y) of a flow rate of a current gas inside the channel dependent on said measured cooling rate value (Mx) of the first sensor by using a calibration table containing pairs of different flow rate values ($\phi$j) and associated cooling rate values (Mj) of the first sensor determined in advance for the gas or a different gas, further comprising a chamber in fluid communication with said channel for receiving gas therefrom and for containing the received gas basically at stand still with respect to its flow, a second sensor, which is of the same type as that of the first sensor and which is arranged inside said chamber and which is connected to the processing means alternatively driving the second sensor to heat it and to let it cool down, determining a cooling rate value (Zx) of the second sensor during its cooling down, and compensating the current cooling rate value (Mx) of the first sensor to provide a compensated cooling rate value (My), on the basis of cooling rate values (Ma, Za) of both sensors obtained recently for the current gas and cooling rate values (Mg, Zg) of both sensors obtained before at stand still of gas inside the channel and the chamber, the processing means being arranged for determining the current flow rate value ($\phi$y) of the gas inside the channel from the compensated cooling rate value (My) by means of a calibration table.

8. Gasmeter according to claim 7, wherein when determining the current flow rate value ($\phi$y) of the gas inside the channel, the processing means calculate and use an average value (Za) of a series of recently measured cooling rate values (Zz) of the second sensor.

9. Gasmeter according to claim 7, wherein, when determining the current flow rate value ($\phi$y) of the gas inside the channel, the processing means calculate and use a cooling rate factor (M0) of the first sensor corresponding to stand still of the current gas in the channel based on one or more recent cooling rate values (Za) of the second sensor and cooling rate values (Mg, Zg) of both sensors obtained in advance for no flow of gas inside the channel.

10. Gasmeter according to claim 7, wherein, when determining the current flow rate value ($\phi$y) of the gas inside the channel, the processing means calculate and use a cooling rate factor (M0) of the first sensor corresponding to stand still of the current gas in the channel based on one or more recent cooling rate values (Za) of the second sensor and cooling rate values (Mg, Zg) of both sensors obtained in advance for no flow of gas inside the channel, and when determining the current flow rate value ($\phi$y) of the gas inside the channel, the processing means calculate the use a correction factor (F0) for the current cooling rate value of the first sensor, based on a calibration cooling rate value (Mc) of the first sensor for the gas used during calibration at basically stand still and on said cooling rate factor (M0) of the first sensor.

11. Gasmeter according to claim 7, wherein when determining the current flow rate value ($\phi y$) of the gas inside the channel, the processing means calculate and use cooling rate factor (M0) of the first sensor corresponding to stand still of the current gas in the channel based on one or more recent cooling rate values (Za) of the second sensor and cooling rate values (Mg, Zg) of both sensors obtained in advance for no flow of gas inside the channel, and when determining the current flow rate value ($\phi y$) of the gas inside the channel, the processing means calculate an aging correction factor (Ft) comprised of an average value (Ma) of a series of current cooling rate values (Mx) of the first sensor divided by said cooling rate (M0) of the first sensor.

12. Gasmeter according to claim 7, wherein an interval between succeeding periods for heating the second sensor is longer than an interval between succeeding periods for heating the first sensor.

* * * * *